United States Patent [19]
Wada

[11] 3,880,449
[45] Apr. 29, 1975

[54] TRICYCLE

[75] Inventor: Hiroshi Wada, Hamamatsu, Shizuoka, Japan

[73] Assignee: Suzuki Motor Co., Ltd., Shizuoka, Japan

[22] Filed: July 29, 1974

[21] Appl. No.: 492,933

[52] U.S. Cl. ............... 280/261; 280/282; 280/283; 280/111
[51] Int. Cl. ............................................ B62m 1/02
[58] Field of Search ........ 280/282, 111, 112 R, 283, 280/261, 284, 287, 112 A; 180/27

[56] References Cited
UNITED STATES PATENTS

| | | | |
|---|---|---|---|
| 3,370,665 | 2/1968 | Stanaback | 280/111 |
| 3,504,934 | 4/1970 | Wallis | 280/282 |
| 3,532,351 | 10/1970 | Kaufman | 280/287 |
| 3,605,929 | 9/1971 | Rolland | 280/111 |
| 3,698,502 | 10/1972 | Patin | 180/27 |

*Primary Examiner*—Robert R. Song
*Attorney, Agent, or Firm*—George B. Oujevolk

[57] ABSTRACT

A tricycle of the construction having one front and two rear wheels supported by front forks and a body frame, comprising an axle frame rotatably supporting the two rear wheels at the both ends, means secured to the rear portion of the body frame for resiliently supporting the axle frame at about its center point, means secured to the rear end of the body frame for supporting a driven shaft on which a driven sprocket is fixedly mounted, and a universal joint for connecting the axle of at least one rear wheel with the driven shaft, the centerline of oscillation of the axle frame relative to the body frame being in agreement with the center of said universal joint.

5 Claims, 10 Drawing Figures

PATENTED APR 29 1975

TRICYCLE

This invention relates to a novel tricycle.

Tricycles, which provide greater stability than bicycles, can be easily ridden by those who are unable to master the two-wheelers. When turning a curve, however, the tricycle becomes less maneuverable and gives less riding comfort because, unlike the bicycle, it cannot be freely tilted sideways toward the center of curvature.

It is therefore a fundamental object of the present invention to provide a tricycle whose body frame can be tilted sideways relative to two rear wheels.

Another object of the invention is to provide a tricycle which, when its body frame is tilted sideways with respect to the two rear wheels, involves neither relative displacement of the drive and driven sprockets nor distorsion of the chain running over the both sprockets.

Other objects and advantages of the invention will become apparent from the following description taken in connection with the accompanying drawings, wherein.

Figure 1:
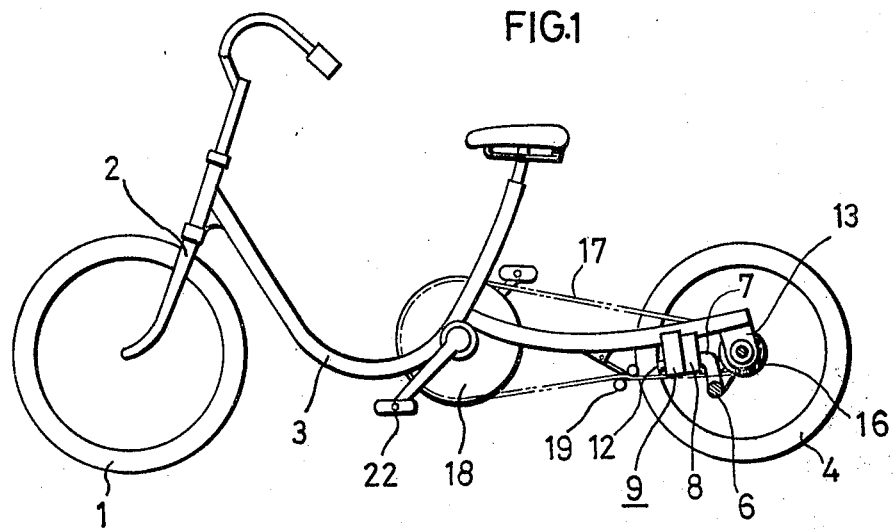
FIG. 1 is a side view of a tricycle embodying the present invention.
Figure 2:
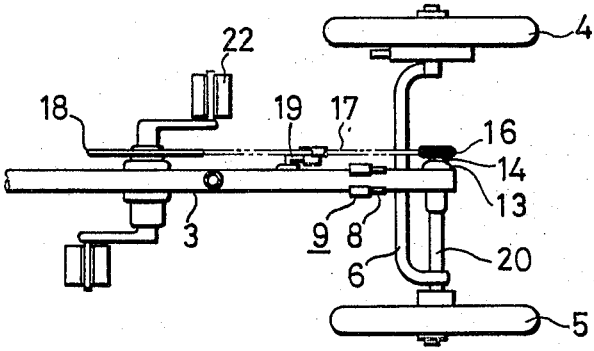
FIG. 2 is a plan view of the vehicle, with its front part broken away.

Referring first to FIGS. 1 through 4, there are shown a front wheel 1, front forks 2 in which the wheel is rotatably held, and a body frame 3 steerably supporting the front forks, all built in the same way as their bicycle counterparts.

Two parallel wheels 4, 5 in the rear are rotatably carried by an axle frame 6 via bearings at the both ends of the frame. A shaft 7 made fast to a middle point of the axle frame 6 extends upwardly and thence frontward to an inverted L-shape, the front end being supported by a bearing 8 fixed to the rear end portion of the body frame 3.

Adjacent to the bearing 8, a resilient support 9 too is fixedly mounted to the rear end portion of the frame 3.

Figure 4:
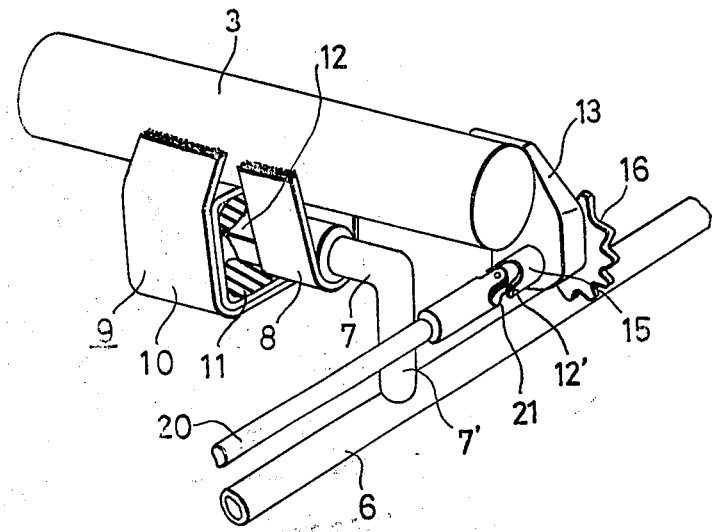
FIG. 4 is an enlarged fragmentary view in perspective showing the construction of the rear body part.

The resilient support 9, as better shown in FIG. 4, constitutes a neidhart mechanism which is known in the art. It comprises a mounting bracket 10, resilient members 11, such as of rubber, disposed in the four corners of the bracket, and a square-shaped columnar extension 12 of the shaft 7 which is inserted into the center space of the bracket surrounded by the resilient members 11.

To the rear end of the body frame 3 is attached an arm 13, which extends rearwardly and has a bearing 14, which in turn supports a driven shaft 15. Onto one end of the driven shaft 15 is mounted a driven sprocket 16, which is connected through an endless chain 17 to a drive sprocket 18.

A chain tensioner 19 of a conventional design is attached to the body frame 3.

A rear axle 20 is coupled to the left rear wheel 5 alone, and, of course, its axis is aligned to that of the right rear wheel 4.

The rear axle 20 and the driven shaft 15 are coupled together by a universal joint 21. The swing center 12' of the universal joint 21 coincides with the centerline of the shaft 7 and hence of the resilient support 9.

Foot pedals are indicated at 22.

With the foregoing construction the tricycle according to the present invention is driven in the following way.

As the rider places his feet on the pedals 22 and thereby rotates cranks connected to the pedals, power is transmitted from the drive sprocket 18 to the driven sprocket 16 through the agency of the endless chain 17. This turns the driven shaft 15, universal joint 21, and the rear axle 20, so that the left rear wheel 5 rotates to move the vehicle forward. The right rear wheel 4 is caused to rotate accordingly. As the tricycle enters a curve, the rider inclines toward the direction in which the vehicle is to run. Consequently, the vehicle tilts against the resilient members 11 on the curving side. The axle frame 6 remains untilted, however, because the universal joint 21 acts to resist the tilt. The both wheels 4, 5 thus grip the ground well without the possibility of skidding. There is no displacement of the sprockets 16, 18 nor distorsion of the chain 17. Should either rear wheel of the moving vehicle run over a dent or bump on the road, the axle frame 6 would accordingly swing and damp down the impact. When the cycle resumes the straight run, the body regains the upright position by dint of the resilient members 11.

Figure 3:
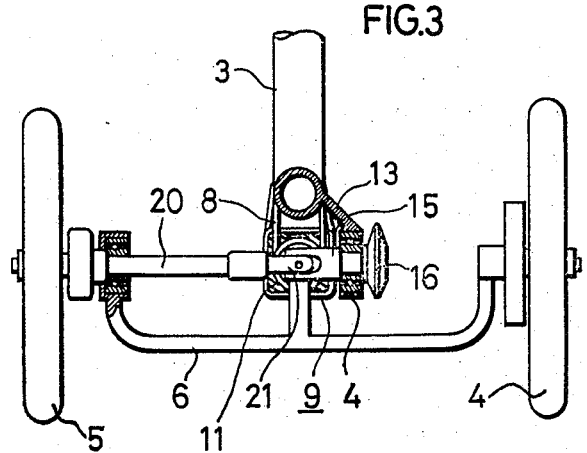
FIG. 3 is an enlarged back view, shown without the upper part and partly in section.
Figure 5:
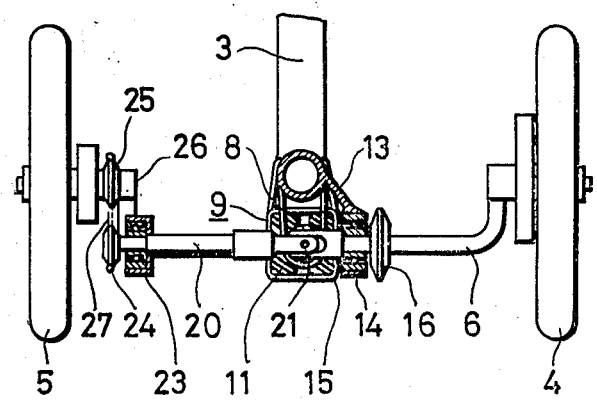
FIG. 5 is a view similar to FIG. 3 but shows another embodiment of the invention.

FIG. 5 illustrates another embodiment of the invention in a view similar to FIG. 3. As can be seen, the body frame 3 of this embodiment has a lower center of gravity than that in FIGS. 1 to 4. Instead of providing the upward extension 7' (FIG. 4), the shaft 7 is directly extended frontward from the axle frame 6 and supported by the bearing 8 and the resilient support 9. This arrangement places the body frame 3 in a lower position in relation to the rear wheels 4, 5, aligning the bearing 8, the support 9, and the axle frame 6 on the same height. A bearing 23 is mounted on the axle frame 6 slightly apart from the main axis of the frame and supports the left end of the rear axle 20.

A sprocket 24 is mounted on the left end of the rear axle 20, and a sprocket 25 on the axle 26 of the wheel 5. The numeral 27 designates an endless chain running over the both sprockets.

The tricycle embodying the invention in the manner described immediately above operates in the same way as the first embodiment shown in FIGS. 1 to 4 with the exception that the rotation of the rear axle 20 is transmitted to the left rear wheel via the sprocket 24, the chain 27 and the sprocket 25.

Figure 6:
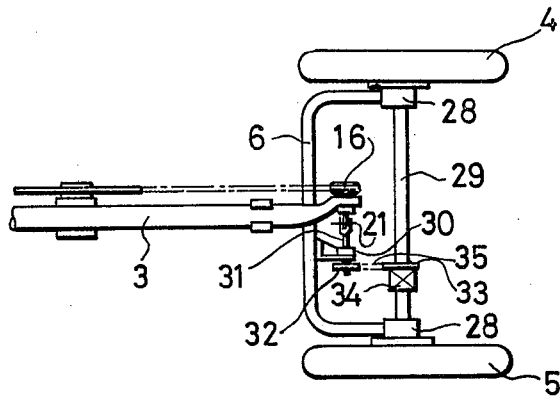
FIG. 6 is a plan view of another embodiment of the invention, with the front part of the tricycle removed.
Figure 7:
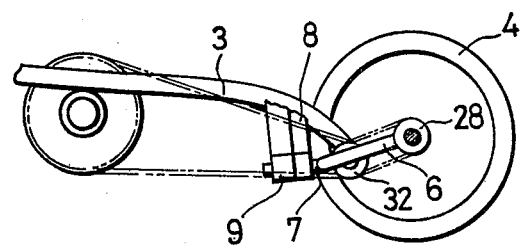
FIG. 7 is a side view of the embodiment shown in FIG. 6, with the rear wheel nearer to the viewer broken away.

FIGS. 6 and 7 represent another embodiment in which the both rear wheels 4, 5 are driven together. As shown, the axle frame 6 has bearings 28 at both ends to support a common axle 29 for the rear wheels 4, 5. Another bearing 30 is secured to the axle frame 6 so as to support an intermediate shaft 31. One end of the shaft 31 is connected to the universal joint 21, and the other end fixedly carries a sprocket 32. An endless chain 35 runs on this sprocket 32 and another sprocket 33 adjacent to a conventional differential gear 34 on the rear axle 29.

From the axle frame 6 extends a shaft 7, which is supported by a bearing 8 carried by the body frame, with the front end of the shaft engaged with a resilient support 9, in the same manner as in the preceding embodiments.

In the embodiment being described, the rotation of the driven sprocket 16 is transmitted to the rear axle 29 via the universal joint 21, intermediate shaft 31, sprocket 32, chain 35, and sprocket 33.

The differential gear 34 functions effectively, as is well known, when the cycle is rounding a curve.

Figure 8:
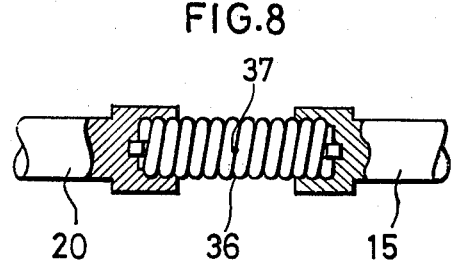
FIG. 8 is a fragmentary side view, partly in section, of one form of the flexible joint used in the embodiment.

The universal joint 21 used in the foregoing embodiments may be replaced by the one illustrated in FIG. 8. In this construction, the member indicated at 36 is a flexible shaft consisting of a coil of spring steel wire. The centerline of the shaft, or the centerline of rocking of the axle frame 6 relative to the body frame 3, has to cross the swing point 37 of the joint.

Figures 9, 10:
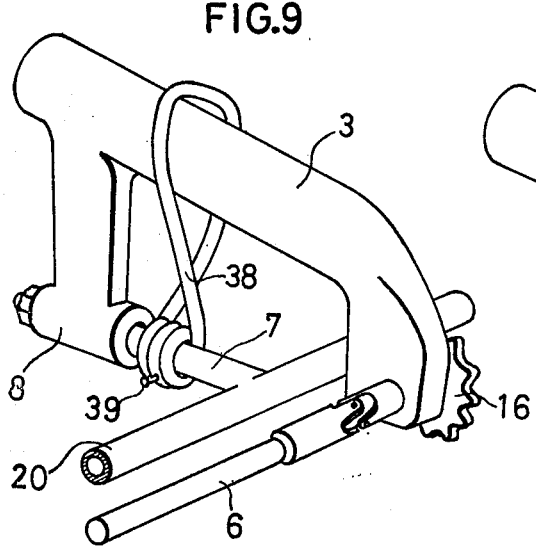
FIG. 9 is a view similar to FIG. 4 but showing a modification using a torsion spring instead of a neidhart mechanism.
FIG. 10 is a view generally similar to FIG. 4 but showing a further modification in which a torsion member of rubber is used instead of a neidhart mechanism.

FIG. 9 shows an arrangement in which the resilient support 9 employs a torsion spring 38, which is made fast to the shaft 7 by a stopper 39.

In FIG. 10 the resilient support 9 uses a torsion member 40 of rubber instead. The cylindrical member is fitted in a support frame 41 and resiliently receives an extension 42 of the shaft 7.

As has been described above, the present invention permits free tilting of the tricycle body sideways when the vehicle is rounding a turn, and accordingly affords riding comfort on curves. On rough roads the axle frame swings to provide a cushioning effect while enabling the rear wheels to have a good grip on the ground. Consequently, the tricycle of the invention is as light and responsive as the bicycle and offers even greater stability. Moreover, it is built at relatively low cost because the driving mechanism of the chain-sprocket type simplifies the construction.

What is claimed is:

1. A tricycle of the construction having one front and two rear wheels supported by front forks and a body frame, comprising an axle frame rotatably supporting the two rear wheels at the both ends, means secured to the rear portion of the body frame for resiliently supporting the axle frame at about its center point, means secured to the rear end of the body frame for supporting a driven shaft on which a driven sprocket is fixedly mounted, and a universal joint for connecting the axle of at least one rear wheel with the driven shaft, the centerline of oscillation of the axle frame relative to the body frame being in agreement with the center of said universal joint.

2. A tricycle as defined in claim 1 wherein the resilient support means is a rubber spring mechanism of the neidhart type.

3. A tricycle as defined in claim 1 wherein the resilient support means is a torsion spring mechanism.

4. A tricycle as defined in claim 1 wherein the resilient support means is a torsion rubber mechanism.

5. A tricycle as defined in claim 1 wherein the universal joint is replaced by a flexible joint.

* * * * *